United States Patent Office 2,943,974
Patented July 5, 1960

2,943,974

PHOSPHORUS ESTERS

Jean Metivier, Arpajon, France, assignor to Societe des Usines Chimiques Rhone-Poulenc, Paris, France, a corporation of France No Drawing. Filed Jan. 5, 1959, Ser. No. 784,852

Claims priority, application France Jan. 28, 1958

8 Claims. (Cl. 167—22)

This invention relates to new phosphorus esters, processes for their preparation, and pesticidal compositions containing them.

According to the present invention there are provided new phosphorus esters of the general formula:

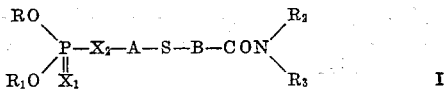
                                        I

Wherein $X_1$ and $X_2$ are the same or different and represent oxygen or sulphur atoms, at least one being a sulphur atom, A represents an ethylene or propylene group, B represents a methylene or ethylidene group, R and $R_1$ represent lower alkyl groups (preferably methyl or ethyl), and $R_2$ and $R_3$ are the same or different and either represent hydrogen atoms, lower alkyl groups or phenyl or cyclohexyl groups or form with the atom to which they are attached a mononuclear saturated heterocyclic group such as piperidino, pyrrolidino or morpholino. By the term "lower alkyl group" as used in this specification and in the appended claims is meant an alkyl group containing not more than four carbon atoms.

According to a feature of the preesnt invention, these new esters are prepared by a process which comprises reacting a halogenophosphate of the general formula:

                                        II with an alcohol or a thiol of the general formula:

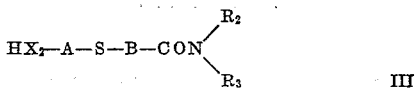
                                        III wherein Hal represents a halogen atom, preferably a chlorine atom, and the other symbols are as hereinbefore defined.

The reaction is preferably carried out in an organic solvent medium at a temperature below 150° C. in the presence of a basic condensing agent. It is preferred to employ as solvent an aliphatic alcohol (preferably methanol or ethanol), an aliphatic ketone (preferably acetone or methylethyl ketone), or a chlorinated hydrocarbon and, as the basic condensing agent, an alkali metal or a derivative thereof (preferably hydroxide or carbonate). The reaction may also be effected without a condensing agent provided the alcohol or the thiol is replaced by one of its alkali metal derivatives.

When in the starting materials $X_1$ represents a sulphur atom and $X_2$ an oxygen atom, there is obtained a mixture of isomers conforming to general Formula I in which, in the case of one isomer, $X_1$ represents a sulphur atom and $X_2$ an oxygen atom (non-transposed or "thiono" form) and, in the case of the other isomers, $X_1$ represents an oxygen atom and $X_2$ a sulphur atom (transposed or "thiolo" form). The "thiono" form may be transposed into the "thiolo" form, for example by the action of heat.

According to a further feature of the invention, the new esters are prepared by a process which comprises reacting an alkali metal salt, preferably the potassium or sodium salt, of a phosphorus derivative of the general formula:

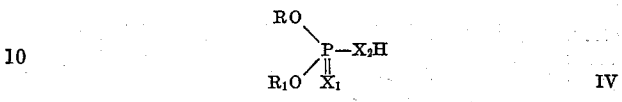
                                        IV with a reactive ester of the general formula:

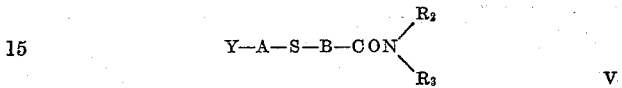
                                        V wherein Y represents the acid residue of a reactive ester such as a halogen atom (preferably chlorine or bromine) or a sulphuric or sulphonic ester residue (preferably the toluene-p-sulphonic residue), and the other symbols are as hereinbefore defined.

When in the starting material of Formula IV, $X_1$ represents a sulphur atom and $X_2$ an oxygen atom, there is obtained a compound conforming to general Formula I in which $X_1$ represents an oxygen atom and $X_2$ a sulphur atom.

According to a still further feature of the present invention, the new esters are prepared by a process which comprises reacting a phosphorus derivative of the general formula:

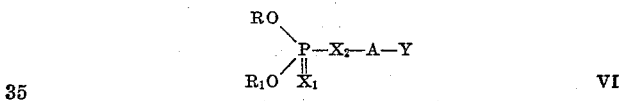
                                        VI with a compound of the general formula:

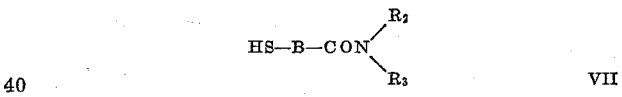
                                        VII wherein the various symbols are as hereinbefore defined.

This process and the last preceding one are preferably carried out in an organic solvent medium, for example an aliphatic alcohol or ketone, at a temperature between 15° C. and 150° C., e.g. at the boiling temperature of the solvent employed.

The new phosphorus esters of the present invention have remarkable pesticidal properties; in particular systemic insecticidal and acaricidal properties. In comparison with known phosphorus ester systemic insecticides they have the advantages of greater persistence and lower toxicity to warm-blooded animals. Compounds of outstanding importance are N-methyl-5-(O.O-diethyldithiophosphoryl-3-thiavaleramide and N-methyl-5-(O.O-diethyldithiophosphoryl)-3-thia-2-methylvaleramide.

According to another feature of the present invention, there are provided pesticidal compositions containing at least one phosphorus ester of general Formula I in association with one or more diluents compatible with the phosphorus ester and suitable for use in pesticidal compositions. Preferably the compositions contain between 0.005 and 50% by weight of phosphorus ester. The compositions may be solid if there is employed a powdered compatible solid diluent such as talc, calcined magnesia, kieselguhr, tricalcium phosphate, powdered cork, absorbent carbon black or a clay such as kaolin or bentonite. Instead of a solid diluent there may be used a liquid in which the phosphorus derivative is dissolved or dispersed. The compositions may thus take the form of aerosols, suspensions, emulsions or solutions in organic or aqueous organic media, for example aromatic hydrocarbons such as toluene or xylene, or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octyl phenol, or fatty acid esters of anhydrosorbitols which have been rendered soluble by etherification of the free hydroxyl groups by condensation with ethylene oxide. It is preferred to use non-ionic compounds because they are not sensitive to electrolytes. When desired, the emulsions of the phosphorus esters may be used in the form of self-emulsifying concentrates containing the active substance dissolved in the dispersing agent or in a solvent compatible with the said agent, a simple addition of water producing compositions ready for use.

The solid compositions are preferably prepared by grinding the solid diluents with the phosphorus ester, or by impregnating the solid diluent with a solution of phosphorus ester in a volatile solvent, evaporating the solvent and, if necessary, grinding the product so as to obtain a powder.

These new compounds may be employed in admixture with other pesticides, including substances having a synergistic effect.

The following examples illustrate the invention.

*Example I*

To a mixture of N-methyl-5-hydroxy-3-thiavaleramide (44.7 g.) and chlorodiethylthiophosphate (56.4 g.) there is added pyridine (23.7 g.), the temperature being maintained at about 45° C. At the end of the addition, the mixture is stirred for 20 minutes at ordinary temperature and then heated at 45° C. for 2 hours and left at ordinary temperature overnight.

The reaction mixture is then taken up in benzene (200 cc.). The precipitate is filtered off and concentrated under reduced pressure. The residue obtained is taken up in water (200 cc.) and is extracted with benzene (200 cc. and 100 cc.). The benzene solution obtained is washed with water (3×150 cc.) and then dried over sodium sulphate. After treatment with decolorising charcoal and evaporation of the solvent under reduced pressure, there remains an oil (68 g.), analysis of which shows it to be a mixture of N-methyl-5-(O.O-diethylthionophosphoryl)-3-thiavaleramide and N-methyl-5-(O.O-diethylthiolophosphoryl)-3-thiavaleramide.

The N-methyl-5-hydroxy-3-thiavaleramide employed as starting material may be prepared by the action of the monochlorhydrin of glycol on N-methyl-thioglycolamide. It boils at 174–177° C./1 mm. Hg.

*Example II*

A mixture of N-methyl-5-(O.O-diethylthionophosphory)-3-thiavaleramide and N-methyl-5-(O.O-diethylthiolophosphoryl)-3-thiavaleramide (30 g.) (prepared as described in Example I) is heated at 95° C. for 5 hours. After cooling, there is obtained a mixture (29 g.) of the same two compounds enriched in the "thiolo" form.

*Example III*

To a solution of potassium diethyldithiophosphate (21.8 g.) in acetone (50 cc.) is added a solution of N-methyl-5-chloro-3-thiavaleramide (15.5 g.) in acetone (120 cc.). The mixture is heated under reflux for 3 hours. After cooling, the precipitate is filtered off and the solution is concentrated under reduced pressure. The residue is taken up in chloroform (100 cc.) and the obtained solution is washed with water (3×50 cc.). After drying, the solvent is evaporated under reduced pressure. There then remains an oil (25 g.), analysis of which shows it to be N-methyl-5-(O.O-diethyldithiophosphory)-3-thiavaleramide.

*Example IV*

To a solution of potassium O.O-diethyldithiophosphate (50 g.) in methylethyl ketone (250 cc.) is added N-methyl-5-chloro-3-thia-2-methylvaleramide (36.3 g.) and the mixture is heated under reflux for 6 hours. After cooling and separation of solid by filtration, the methylethyl ketone is driven off under reduced pressure. The obtained residue (79 g.) is taken up in benzene (150 cc.) and washed with a 10% sodium bicarbonate solution (50 cc.) and several times with water. After drying over sodium sulphate, the benzene is driven off under reduced pressure and the obtained residue is finally concentrated under 1 mm. of mercury with heating at 50–60° C. Analysis of the obtained residual oil (46 g.) shows it to be N-methyl-5-(O.O-diethyldithiophosphory)-3-thia-2-methylvaleramide.

*Example V*

To a solution of potassium O.O-diethyldithiophosphate (50 g.) in methylethyl ketone (250 cc.) is added N-ethyl-5-chloro-3-thia-2-methylvaleramide (38.2 g.) and the mixture is heated under reflux for 7 hours. The reaction mixture is thereafter treated as described in Example IV. After evaporation of the benzene in vacuo, there remains an oil (46 g.), analysis of which shows it to be N-ethyl-5-(O.O-diethyldithiophosphoryl)-3-thia-2-methylvaleramide.

*Example VI*

To a solution of potassium O.O-diethyldithiophosphate (33.5 g.) in methylethyl ketone (220 cc.) is added N-propyl-5-chloro-3-thia-2-methylvaleramide (29.5 g.) and the mixture is heated under reflux for 5 hours. The reaction mixture is thereafter treated as described in Example IV. There is finally obtained an oil (39 g.), analysis of which shows it to be N-propyl-5-(O.O-diethyldithiophosphoryl)-3-thia-2-methylvaleramide.

The 5-chloro-3-thia-2-methylvaleramides employed as starting materials in Examples IV, V and VI are prepared by the action of 1-chloro-2-bromoethane on the corresponding thiolactamides in the presence of an acid binding agent for hydrochloric acid.

Physical constants for these substances are:

N - methyl - 5 - chloro-3-thia-2-methylvaleramide—M.P. 56–57° C.;

N - ethyl - 5 - chloro - 3 - thia-2-methylvaleramide—M.P. 55–56° C.;

N - propyl - 5 - chloro-3-thia-2-methylvaleramide—B.P.= 135–138° C./ 1 mm. Hg.

*Example VII*

To a solution of potassium O.O.-dipropyldithiophosphate (56 g.) in methylethyl ketone (250 cc.) is added N-methyl-5-chloro - 3 - thiavaleramide (39.5 g.). After heating for 6 hours and following the treatment described in Example IV, there is obtained a yellow oil (54 g.), analysis of which shows it to be N-methyl-5-(O.O-dipropyldithiophosphoryl)-3-thiavaleramide.

*Example VIII*

To a solution of potassium O.O-diethyldithiophosphate (38 g.) in methylethyl ketone (200 cc.) is added N-methyl-5-chloro-5-methyl-3-thiavaleramide (28 g.) and the mixture is heated for 6 hours. After treatment of the reaction mixture as described in Example IV, there is obtained an oil (22 g.) analysis of which shows it to be N - methyl-5-(O.O - diethyldithiophosphoryl)-5-methyl-3-thiavaleramide.

N-methyl - 5 - chloro-5-methyl-3-thiavaleramide is obtained by the action of 1-bromo-2-chloropropane on N-methyl-thioglycolamide in the presence of an acid binding agent for hydrochloric acid. It distils at 145–148° C./2 mm. Hg.

Example IX

N-methyl-5-bromo-3-thiavaleramide (31.8 g.) is added to a solution of potassium O.O-dimethyldithiophosphate (39.7 g.) in acetone (120 cc.) and the mixture is stirred for 18 hours. After treatment of the reaction mixture as described in Example IV there is obtained a yellow oil (32 g.), analysis of which shows it to be N-methyl-5-O.O-dimethyldithiophosphoryl)-3-thiavaleramide.

Example X

N-methyl-5-bromo-3-thiavaleramide (84.8 g.) is added to a solution of potassium O.O.-diethyldithiophosphate (125 g.) in acetone (300 cc.) and the mixture is stirred at ordinary temperature for 12 hours. After treatment of the reaction mixture as described in Example IV, there is obtained N-methyl-5-(O.O.-diethyldithiophosphoryl)-3-thiavaleramide (118.5 g.).

Example XI

N - methyl - 5 - bromo - 3 - thiavaleramide (31.8 g.) is added to a solution of sodium O.O-diethylthionophosphate (22.8 g.) in ethyl alcohol (150 cc.) and the mixture is heated under reflux for 6 hours. After cooling and separation of the formed precipitate by filtration, the alcoholic solution is concentrated under reduced pressure. The oil obtained is taken up in water (100 cc.) and the obtained solution is filtered after treatment with decolorising charcoal.

The filtrate is extracted several times with chloroform. The combined chloroformic solutions are dried over sodium sulphate. The chloroform is evaporated under reduced pressure, and then under 1 mm. of mercury with heating at 50–60° C. There finally remains a substantially colourless oil (45 g.), analysis of which shows it to be N - methyl - 5 - (O.O - diethylthiolophosphoryl) - 3-thiavaleramide.

The N-methyl-5-bromo-3-thiavaleramide employed as starting material in Examples IX, X and XI is prepared by the action of N-methylthiogylcolamide on 1:2-dibromoethane in the presence of an acid binding agent for hydrobromic acid. It melts at 65–66° C.

Example XII 5-chloro-3-thiavaleramide (30.6 g.) is added to a solution of potassium O.O-diethyldithiophosphate (56 g.) in methylethyl ketone (200 cc.) and the mixture is heated under reflux for 6 hours. After treatment of the reaction mixture as described in Example IV, there is obtained a yellow oil (45 g.), analysis of which shows it to be 5-(O.O-diethyldithiophosphoryl)-3-thiavaleramide.

The 5-chloro-3-thiavaleramide employed as starting material is prepared in manner analogous to that previously described for other starting materials. It melts at 62° C.

Example XIII

N-ethyl-5-chloro-3-thiavaleramide (45.2 g.) is added to a solution of potassium O.O-diethyldithiophosphate (70 g.) in methylethyl ketone (450 cc.) and the mixture is heated under reflux for 10 hours. The reaction mixture is thereafter treated as described in Example IV. There is obtained a yellow oil (56 g.), analysis of which shows it to be N-ethyl-5-(O.O-diethyldithiophosphoryl)-3-3-thiavaleramide.

The N-ethyl-5-chloro-3-thiavaleramide employed as starting material is prepared by the action of 1-chloro-2-bromoethane on N-ethylthioglycolamide in the presence of an acid binding agent for hydrobromic acid. It melts at 65–66° C.

Example XIV

N-dimethyl-5-chloro-3-thiavaleramide (23 g.) is added to a solution of potassium O.O-diethyldithiophosphate (32.5 g.) in methylethyl ketone (190 cc.) and the mixture is heated under reflux for 8 hours. After treatment of the reaction mixture as described in Example IV, there is obtained a yellow oil (23 g.), analysis of which shows it to be N - dimethyl - 5 - (O.O-diethyldithiophosphoryl)-3-thiavaleramide.

The N - dimethyl - 5 - chloro - 3 - thiavaleramide employed as starting material is prepared in manner analogous to that previously described for other starting materials. It is a liquid boiling at 95–97° C. under 2 mm. of mercury with slight decomposition.

Example XV

N-ethyl-5-chloro-3-thiavaleramide (45 g.) is added to a suspension of sodium O.O-dimethylthionophosphate (61.5 g.) in methylethyl ketone (400 cc.) and the mixture is heated under reflux for 7 hours. After treatment of the reaction mixture as described in Example XI, there is obtained an oil (14 g.), analysis of which shows it to be N-ethyl-5-(O.O-dimethylthiolophosphoryl)-3-thiavaleramide.

Example XVI

N-isopropyl-5-chloro-3-thiavaleramide (39.2 g.) is added to a solution of potassium O.O-diethyldithiophosphate (52 g.) in methylethyl ketone (400 cc.) and the mixture is heated under reflux for 12 hours. After treatment of the reaction mixture as described in Example IV, there is obtained N-isopropyl-5-(O.O-diethyldithiophosphoryl)-3-thiavaleramide (54 g.).

The N - isopropyl - 5 - chloro - 3 - thiavaleramide employed as starting material is obtained by the action of 1-chloro-2-bromoethane on N-isopropylthioglycolamide. It is a liquid, which when obtained as just described can be employed without subsequent purification.

Example XVII (5 - chloro - 3 - thiavaleroyl)morpholine (65 g.) is added to a solution of potassium O.O-diethyldithiophosphate (76 g.) in methylethyl ketone (550 cc.). By proceeding as described in Example XVI, there is obtained [5 - (O.O - diethyldithiophosphoryl) - 3 - thiavaleroyl] morpholine (70 g.).

The (5-chloro-3-thiavaleroyl)morpholine employed as starting material is prepared in manner analogous to that described in Example XVI for N-isopropyl-5-chloro-3-thiavaleramide.

Example XVIII

1 - O.O - diethyldithiophosphoryl - 2 -chloroethane (24.8 g.) and potassium carbonate (15.1 g.) are added to a solution of N-methyl-thioglycolamide (12.6 g.) in acetone (150 cc.). After heating under reflux for 6 hours, the reaction mixture is treated as described in Example IV. There is obtained N-methyl-5-(O.O-diethyldithiophosphoryl)-3-thiavaleramide (20 g.).

Example XIX

Xylene (40 g.) and terpinolene (20 g.) are added to the mixture of esters prepared as described in Example I (20 g.). The obtained solution is diluted with a condensate (20 g.) of ethylene oxide with octyl phenol. A self-emulsifying concentrate is thus obtained which can be diluted at the time of use.

Example XX

To the mixture of esters prepared as described in Example II (40 g.) are added xylene (40 g.) and a condensate (20 g.) of ethylene oxide with octyl phenol. The obtained solution is suspended in water (100 litres). This aqueous solution is used for effectively combatting green fly and red spiders.

Example XXI

An ethylene oxide condensate (0.5 g.) containing 10 molecules of ethylene oxide per molecule of octylphenol is added to a solution of N-methyl-5-(O.O-diethyldithiophosphoryl)-3-thia-2-methyl-valeramide (10 g.) in acetone (10 g.). Charcoal (10 g.) is incorporated in the obtained solution which is agitated to make it homogeneous. The solvent is evaporated off and, when this operation is complete, the obtained powder is finely ground.

Bean seeds are treated in the dry state with this powder in a proportion of 4 g. of powder to 100 g. of seeds. The beans are then planted and when the plants have developed they are contaminated with red spiders (*Tetranychus telarius*). Two days after contamination, the parasites are dead.

*Example XXII*

A powder containing 5-(O.O-diethyldithiophosphoryl)-3-thiavaleramide (obtained as described in Example X) is prepared following the procedure described in Example XXI. Broad bean and nasturtium seeds are treated with the obtained powder in the proportion of 2 g. of powder to 100 g. of seeds. The treated seeds are then planted and effective and lasting protection for the resultant plant against green fly is obtained.

*Example XXIII*

To N-ethyl-5-(O.O-diethyldithiophosphoryl)-3-thia-2-methylvaleramide (20 g.) (prepared as described in Example V) are added xylene (70 g.) and an ethylene oxide condensate (10 g.) containing 10 molecules of ethylene oxide per molecule of octylphenol. There is thus obtained a self-emulsifying concentrate which, when diluted with water (100 litres), gives a solution which can be used for spraying apple trees to provide effective and lasting protection against, in particular, green fly and red spiders.

*Example XXIV*

To N-methyl-5-(O.O-diethylthiolophosphoryl)-3-thiavaleramide (10 g.) (prepared as described in Example XI) are added xylene (40 cc.) and aerosol O.T. (sodium dioctylsulphosuccinate) (10 g.).

The self-emulsifying solution thus obtained is diluted with water (50 litres). By spraying this aqueous solution on to beanstalks infested with green fly, complete destruction of the green fly is obtained.

*Example XXV*

Nasturtium plants infested with green fly are treated by spraying thereon an emulsion of N-methyl-5-(O.O-diethylthiophosphoryl)-3-thiavaleramide (20 g.) (obtained as described in Example X) in water (100 litres). Two days after treatment, the plants are completely free from their parasites and remain so.

I claim:

1. A member of the class consisting of phosphorus esters of the general formula:

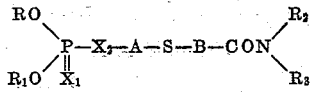

wherein $X_1$ and $X_2$ are members of the class consisting of oxygen and sulphur atoms, at least one being a sulphur atom, A represents a member of the class consisting of ethylene and propylene groups, B represents a member of the class consisting of methylene and ethylidene groups, R and $R_1$ represent lower alkyl groups, and $R_2$ and $R_3$, represent members of the class consisting of hydrogen atoms and lower alkyl groups.

2. A member of the class consisting of phosphorus esters of the general formula:

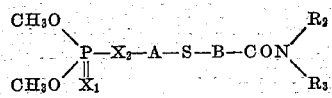

wherein $X_1$ and $X_2$ are members of the class consisting of oxygen and sulphur atoms, at least one being a sulphur atom, A represents a member of the class consisting of ethylene and propylene groups, B represents a member of the class consisting of methylene and ethylidene groups, and $R_2$ and $R_3$ represent members of the class consisting of hydrogen atoms and lower alkyl groups.

3. A member of the class consisting of phosphorus esters of the general formula:

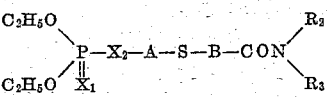

wherein $X_1$ and $X_2$ are members of the class consisting of oxygen and sulphur atoms, at least one being a sulphur atom, A represents a member of the class consisting of ethylene and propylene groups, B represents a member of the class consisting of methylene and ethylidene groups, and $R_2$ and $R_3$ represent members of the class consisting of hydrogen atoms and lower alkyl groups.

4. N - methyl - 5 - (O.O - diethyldithiophosphoryl) - 3 - thiavaleramide.

5. N-methyl-5-(O.O-diethyldithiophosphoryl)-3-thia-2-methylvaleramide.

6. A pesticidal composition comprising at least one phosphorus ester of the general formula:

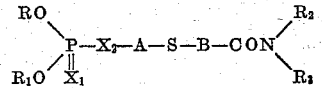

wherein $X_1$ and $X_2$ are members of the class consisting of oxygen and sulphur atoms, at least one being a sulphur atom, A represents a member of the class consisting of ethylene and propylene groups, B represents a member of the class consisting of methylene and ethylidene groups, R and $R_1$ represent lower alkyl groups, and $R_2$ and $R_3$ represent members of the class consisting of hydrogen atoms and lower alkyl groups, together with a significant amount of at least one diluent compatible therewith.

7. A pesticidal composition as claimed in claim 6 wherein the quantity of phosphorus ester is between 0.005 and 50% by weight of the composition.

8. A pesticidal composition according to claim 6 which contains an agent selected from the group consisting of wetting, dispersing and emulsifying agents.

References Cited in the file of this patent

UNITED STATES PATENTS

| | | |
|---|---|---|
| 2,494,283 | Cassaday et al. | Jan. 10, 1950 |
| 2,571,989 | Schrader | Oct. 16, 1951 |
| 2,586,655 | Hook et al. | Feb. 19, 1952 |
| 2,614,988 | Hook et al. | Oct. 21, 1952 |